United States Patent [19]

Geary

[11] 4,196,461
[45] Apr. 1, 1980

[54] PATTERN GENERATING ENTERTAINMENT DEVICE

[75] Inventor: Michael L. Geary, Birchington, England

[73] Assignee: Chartglen, Ltd., London, England

[21] Appl. No.: 18,066

[22] Filed: Mar. 6, 1979

[51] Int. Cl.² .................... F21K 1/00; F21V 7/00; G02B 27/17
[52] U.S. Cl. .................... 362/259; 350/6.9; 362/298; 362/346; 362/811
[58] Field of Search ............... 362/259, 298, 301, 346, 362/347, 348, 806, 811; 350/6.1, 6.5, 6.9

[56] References Cited

U.S. PATENT DOCUMENTS

| | | | |
|---|---|---|---|
| 2,758,502 | 8/1956 | Scott | 350/6.9 |
| 3,609,339 | 9/1971 | Smith | 362/811 |
| 3,619,028 | 11/1971 | Keene | 350/6.9 |
| 3,757,106 | 9/1973 | Bau | 362/811 |
| 4,154,507 | 5/1979 | Barr | 350/6.9 |

Primary Examiner—Samuel W. Engle
Assistant Examiner—Donald P. Walsh
Attorney, Agent, or Firm—James J. Burke, II

[57] ABSTRACT

A collimated light source, preferably coherent, is directed at an optical system comprising a plurality of controllably rotatable mirrors, the source going from one to the next in seriatim, and each mirror being mounted a small number of degrees "off" the optical axis, so as to oscillate upon rotation. With the rotational speed of each mirror individually controllable, a substantially infinite number of patterns can be generated. Further variations in pattern generation can be achieved with a beam clipper, pulse modulation by an analog (e.g. audio) signal, and/or other known beam-modifying devices. A preferred embodiment is adapted for entertainment purposes and employs a low-power laser and three mirrors. Other applications include pattern-recognition testing of individuals for optometric or psychological purposes.

5 Claims, 4 Drawing Figures

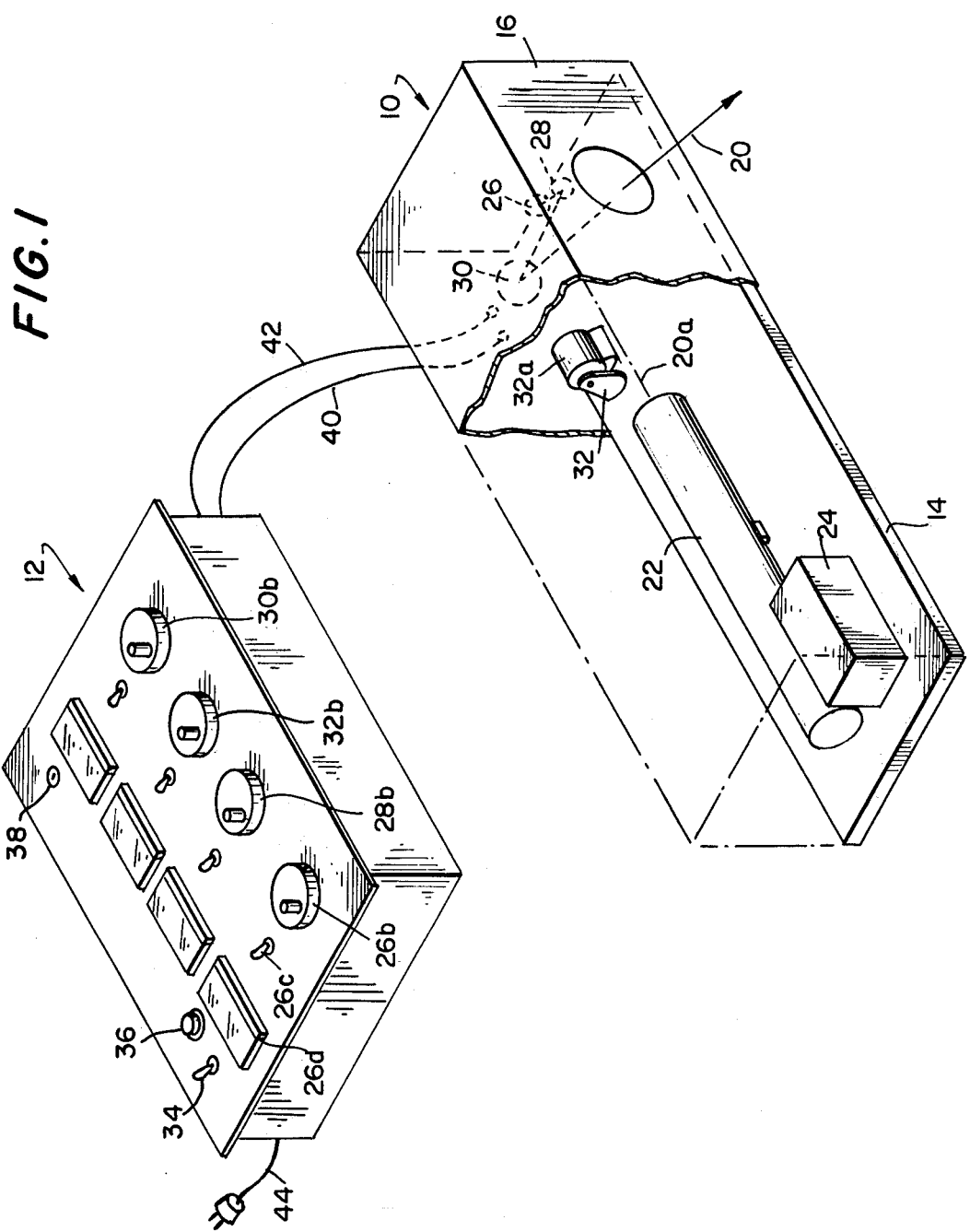

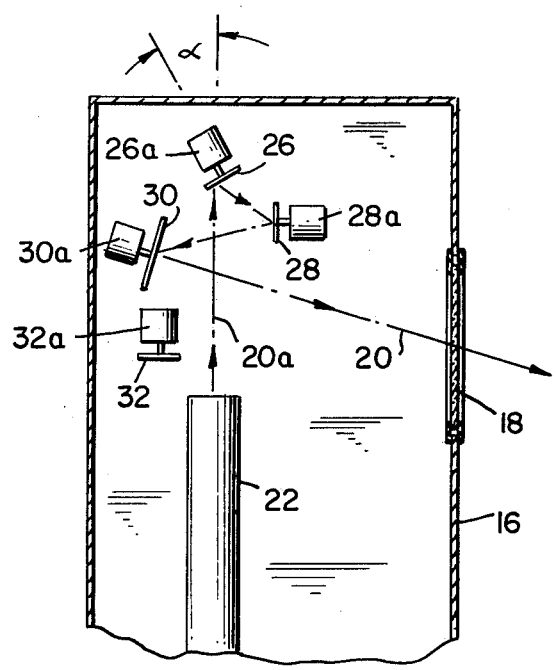
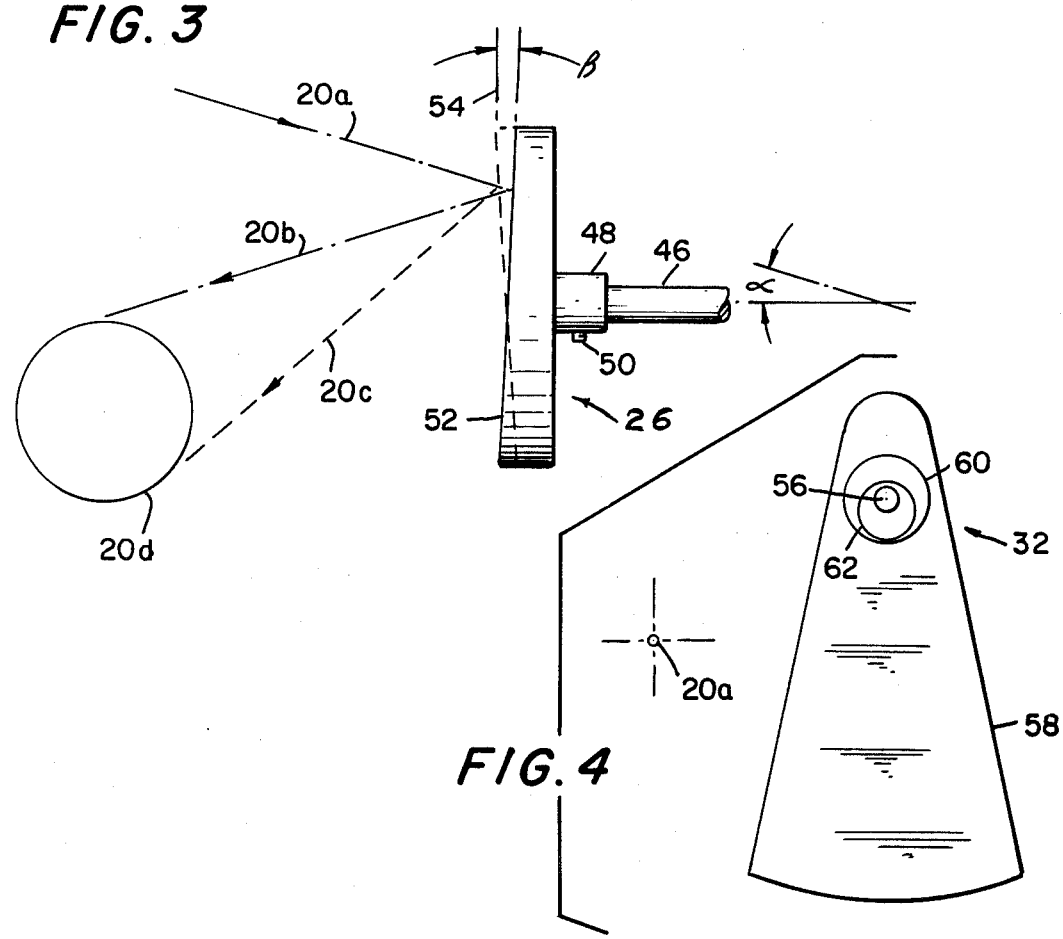

PATTERN GENERATING ENTERTAINMENT DEVICE

BACKGROUND OF THE INVENTION

The present invention relates generally to pattern generating equipment. More particularly, the invention relates to laser-powered pattern generators that are used for entertainment purposes in discoteques, night clubs, concerts and the like, though other applications are apparent.

While the invention will be described in connection with a coherent light source (e.g. a laser), it can of course be employed with any collimated source. It is to be noted, however, that at least in the preferred embodiments the cost of lenses etc. needed for collimation, plus the need for their very accurate placement, will raise overall costs to unacceptable levels.

It is also to be noted, in connection with any laser usage, that safety measures appropriate to the beam power must be observed.

PRIOR ART

The creation of interesting lighting effects at entertainment or even religious events is probably as old as the wax candle. The rotating sphere covered with individual mirror facets, illuminated by a carbon-arc spotlight and slowly rotating filters of various colors, has been a fixture at dances and parties for generations. Recent variations on this theme may be found in Nottingham, U.S. Pat. No. 3,119,565 and Krzyston, U.S. Pat. No. 3,634,679. The synchronization of light and music can be accomplished in a variety of ways, such as mirror mounted on a voice-coil transducer as disclosed by Latterman et al, U.S. Pat. No. 4,010,361. Generally, a filter is employed to eliminate all but "beat" frequencies for such a device.

Of more direct interest are two systems adapted to create a large number of light effects from a coherent source. Bau et al, U.S. Pat. No. 3,757,106 disclose a system wherein it is possible to attenuate, focus, diffuse or distribute the source beam, coordinate several beams of different colors, and use both reflecting and semi-transparent mirrors with various beam modulators. In the latter category are liquid crystals, thermal emulsions, lacquer coatings, and other transmission devices, which can be shifted in and out of the beam or tilted with respect to the beam, increasing the distance the beam travels through the modulator and changing the effect. Other beam moulators are disclosed by Slater et al, U.S. Pat. No. 4,006,970, including wheels covered with aluminized Mylar (trademark). Called "burn wheels", they distort under the heat of the source beam. An oscillating (x-y) mirror is also disclosed. This patent, for a very elaborate and expensive system, provides a multi-spectral laser source, which is beam split, and the separate beams are aligned with prisms. Solenoid-operated mirrors can move in and out of the path to direct the beam to various modulators.

In the scientific area, the disclosure of Fournier et al, U.S. Pat. No. 3,762,791 is of interest, for the showing of a complex, laser-powered waveform generator for electro-optic purposes.

In sum, the known prior art is devoted to laser modulation systems that are effective, but necessarily complex and expensive.

OBJECTS OF THE INVENTION

A general object of the present invention is to provide a simple and inexpensive optical pattern generator, compared to known devices.

A further object of the present invention is to provide a simple laser pattern generator capable of producing a substantially infinite number of patterns.

Another object of the present invention is to provide a laser pattern generator that is simple to operate, readily programmable, and wherein any desired pattern may be reproduced.

Various other objects and advantages of the invention will become clear from the following description of embodiments, and the novel features will be particularly pointed out in connection with the appended claims.

THE DRAWINGS

Reference will hereinafter be made to the accompanying drawings, wherein:

FIG. 1 is a perspective view, partially cut away, illustrating the laser-optical unit and the control unit of a preferred embodiment of the invention;

FIG. 2 is a partial plan view of the FIG. 1 laser-optical unit, illustrating the general layout of the optical system;

FIG. 3 is an elevation view of one of the mirrors of the FIG. 2 optical system;

FIG. 4 is an elevation of a beam-clipper that may be employed with the invention;

DESCRIPTION OF EMBODIMENTS

FIG. 1 shows a preferred embodiment of the invention, and attention is directed thereto.

The system comprises a laser-optical unit 10 and a control unit 12. Separate units are preferred inasmuch as control unit 12 will generally be part of a control console, and unit 10 will be remotely mounted for projection onto a suitable screen or other projection surface (contrary to impressions created by science fiction films, the beam itself is not visible in space unless there is smoke or other particulate matter in the air).

Referring to laser-optical unit 10, a mounting board 14 has an opaque rectangular enclosure 16, and includes a single window 18 through which the output beam pattern 20 travels. Enclosure 16 should be tight, to prevent dust or foreign matter from entering the optical system. Well over half of board 14 is taken up with laser tube 22 and its associated power supply 24. Since these units are off-the-shelf items purchased from manufacturers or distributors, they needn't be described in detail. In the preferred embodiment, a 0.5 mw helium-neon laser is employed, but other types and sizes can obviously be employed.

The optical path of beam 20 from laser 22 to window 18 comprises reflection off mirrors 26, 28 and 30, and optionally through beam-clipper 32, the positioning and operation of which are discussed hereinbelow in connection with FIGS. 2–4.

Control unit 12 can be adequately understood with reference to the control elements. The optical system includes four motors 26*l*, 28*a*, 30*a*, 32*a* (FIG. 2) which are speed-controlled by four precision triacs 26*b*, 28*b*, 30*b*, 32*b* in control unit 12. Each triac 26*b* has an associated switch 26*c* and milliammeter 26*d*. The latter is an optional feature, as set forth hereinbelow.

An on-off power switch 34 and "power on" light 36 complete the controls. A key lock 38 may be provided to prevent unauthorized use. Units 10, 12 are connected by a high voltage cord 40 (110 or 220 v.) and a low-voltage cord 42 (9-16 v. DC) for driving motors 26a-32a. Control unit 12 is also provided with a line cord (mains connection) 44.

Understanding of the optical system will be facilitated by referring to FIGS. 2 and 3, and attention is directed thereto. While FIG. 2 shows a three mirror system 26, 28, 30, it will be apparent that two, four or more elements could be included. For simplicity, FIG. 2 shows the laser 22 "on" but everything else "off", so that beam 20 stays in one place. If the beam 20a issuing from the laser 22 is considered the original beam axis, motor 26a is placed at an angle $\alpha$ thereto, and is positioned so that beam 20a hits mirror 26 well off center. The angle is chosen so that the reflected beam hits mirror 28, but much more centrally for reasons discussed below. The twice-reflected beam hits mirror 30, and re-reflects out window 18. The precise angles of motors 28a and 30a, as well as $\alpha$ with respect to beam axis 20a must be determined on the basis of the size and configuration of mirrors 26, 28, 30. It will be appreciated that, as the value of $\alpha$ increases, the beam 20a "spreads" upon hitting mirror 26, and the degree of spread varies as angle $\beta$ varies with rotation.

Beam clipper 32 and motor 32a are parallel to beam axis 20a and spaced therefrom so as to only clip the beam when turned on. Any electro-mechanical beam clipper should act directly on beam 20a and not on a reflected beam, since the beam, and not an entire pattern, are to be clipped.

The basic means of pattern generation is shown in FIG. 3. Mirror 26 is mounted for rotation on shaft 46 of motor 26a in any convenient manner, such as by sleeve 48 and set screw 50. While mirror 26 is generally normal to the $\alpha$ or shaft axis, its reflecting surface 52 is at a specific angle $\beta$ to the plane 54 normal to $\alpha$. In a preferred embodiment, $\beta$ is 3° for mirrors 26 and 28, and can be anywhere from 1° to 4° for mirror 30. In the position shown, incident beam 20a will produce reflected beam 20b; with 180° of rotation of mirror 26 as shown in phantom, reflected beam 20c will be produced. Thus, with slow rotation of mirror 26 the dot projected by the beam will trace a circle and, as rotational speed increases to the point where the human eye can no longer resolve the moving dot (roughly, ten revolutions per second) a circle pattern 20d is produced. Even though angle $\alpha$ is fixed, the degree of beam spread varies with rotation of mirror 26 and variation of angle $\beta$. At substantial rotation speeds, this gives the appearance of some beam thickening.

Circle 20d (or a slowly tracing dot) is thus projected onto mirror 28 and, needless to say, with rotation thereof a more complex pattern is produced, which will change with the speed setting of triac 28b. Pattern possibilities are further extended with rotation of mirror 30, controlled by triac 30b.

It will be appreciated that successive reflections of beam 20a off mirrors 26, 28, 30 will, because of additive angles $\beta$ associated with each, create successively larger images. For this reason, it is generally necessary for mirror 30 to be about twice as large as mirrors 26 or 28.

For safety reasons it is desireable to have the minimum setting of triac 26b slowly rotate mirror 26, making beam 20 scan and preventing any observer from looking directly into the beam for more than a fraction of a second. Further, pattern generation capabilities are doubled by making switch 26c a rotational direction-reversing switch, which causes an inverted image to be produced, e.g. a circle with three internal lobes becomes a triangle with three external lobes.

Use of a beam clipper produces line-chasing patterns. Beam-clipping can be accomplished by merely switching the laser on and off, which can be done electronically at desired and controllable frequencies. A simple electromechanical beam clipper is shown at 32 in FIGS. 1 and 2 and is illustrated in functional detail in FIG. 4. A disc 60 with eccentric weight 62 attached presses on arm 58 and, upon rotation of shaft 56, centrifugal action causes the arms fly out and clip the beam. When motor 32a is turned off, however, arms 58 fall out of the way of beam 20a. Other methods of beam clipping are apparent: a cam on shaft 56 and a cam follower on arm(s) 58 could be used. If motor 32a is of the servo type wherein the rotor and stator always come to rest in a predetermined relation, beam clipping can be carried out by journalling a disc having etched holes or slots on shaft 56, the disc being positioned so that beam 20a passes there-through when motor 32a is "off." The net effect is that, for any given continuous pattern when the beam clipper is "off" either linechasing or substantially disjointed patterns are produced, depending on the setting of the beam-clipper triac 32b.

As noted above, milliammeters 26d etc. are used to reproduce any desired pattern. In particular, it is only necessary to note the four milliammeters settings on any given pattern, and re-setting to those levels will reproduce the pattern. In this connection, it is important to note that, with precision triacs 26b, more than ten complete turns of the knob are necessary to brng any motor from zero to full speed, so very precise speed adjustment is possible. Also, because of this kind of precision control, patterns can be changed from rapid rotation to slow, undulant movement to stationary.

While the foregoing describes the structure and operation of the invention, it does not give a complete impression of the variety of patterns that may be produced thereby. As noted, with everything off but mirror 26 slowly rotating, beam 20a traces a circle which, with increasing speed of mirror 26 by triac 26b becomes a "solid" circle. Turning on triac 28b with triac 26b in the zero position creates an erratically scanning dot. Increasing 26b creates a spirograph-type design of a number of solid circles. Increasing 26a creates patterns of interlocked circles up to a point and then changes to a pattern of expanding and contracting circles, the expansion/contraction speed being controllable with 28b or 26a. Use of invert switch 26c changes the pattern to slowly rotating elongated circles, as if circles were being viewed from one side. Adding in mirror 30 with triac 30b can make this figure undulate in a three-dimensional fashion, rather like a rubber band floating in air. Cutting out triac 28b can create a circle with one to six internal lobes, and inverting with 26c creates external lobes. Cutting back on 30b can produce single or interlocked triangles, or a star pattern (five-pointed). With any pattern, careful speed adjustment can cause a pattern to rotate or remain substantially stationary. In essence, the only limit on pattern generation is the number of combinations of settings that triacs 26b, 28b, 30b are capable of.

Other types of beam modulation, liquids, gases, other types of reflection techniques, can of course be employed. But, it will be appreciated that higher power beams are preferred for such applications.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A pattern generating entertainment device for projected images comprising:

a collimmated light source producing a beam;

a plurality of mirrors positioned to intercept and reflect said beam in seriatim;

each said mirror being rotatable about a central axis in a plane generally normal to said beam;

each said mirror having its reflecting face inclined at an angle in the range of 1° to 5° to said normal plane;

said mirrors being positioned and sized to intercept and reflect both said beam and patterns generated upon rotation of one or more of said mirrors;

motor drive and precise speed control means for each said mirror, whereby any mirror can be rotated at a precisely controllable speed;

one said drive means including rotational-direction-reversing means whereby any generated pattern may be inverted; and beam-clipping means capable of intercepting said beam at a controllable frequency prior to reflection by any of said mirrors, whereby line-chasing patterns may be generated.

2. The pattern generator as claimed in claim 1, wherein said source is a laser.

3. The pattern generator as claimed in claim 1, wherein each said drive and control means comprises a motor having a shaft on said central axis attached to one said mirror, and a triac motor speed control.

4. The pattern generator as claimed in claim 3, wherein each said triac has an associated milliammeter.

5. The pattern generator as claimed in claim 2, and additionally comprising a first enclosure for said laser, said mirrors and said drive means, and a second enclosure for said control means, said first enclosure including a window positioned to pass the reflected beam or pattern.

* * * * *